United States Patent [19]
Kirchhoff et al.

[11] Patent Number: 5,895,891
[45] Date of Patent: Apr. 20, 1999

[54] ELECTRONIC BALANCE WITH DATA OUTPUT FOR USE IN EXPLOSIVE AREAS

[75] Inventors: Rainer Kirchhoff, Hattorf; Paul von der Haar; Heinz von Soosten, both of Göttingen; Christian Oldendorf, Göttingen; Heinz-Gerhard Köhn, Dransfeld; Dieter Klausgrete, Göttingen, all of Germany

[73] Assignee: Sartorius AG, Göttingen, Germany

[21] Appl. No.: 08/879,611

[22] Filed: Jun. 20, 1997

[30] Foreign Application Priority Data

Jun. 20, 1996 [DE] Germany .................. 196 24 554

[51] Int. Cl.⁶ .................. G01G 19/22; G01G 21/28; G01V 3/00
[52] U.S. Cl. .................. 177/25.13; 177/238; 702/188; 340/853.1
[58] Field of Search .................. 702/188; 340/853.1, 340/870.01; 177/180, 238, 239, 240, 241, 242, 243, 25.13, 124

[56] References Cited

U.S. PATENT DOCUMENTS 4,632,199 12/1986 Ober et al. .................. 177/238
4,751,648 6/1988 Sears, III et al. .................. 340/853.1
4,969,112 11/1990 Castle .................. 177/25.13
5,469,150 11/1995 Sitte .................. 340/870.01

*Primary Examiner*—Randy W. Gibson
*Attorney, Agent, or Firm*—Eric P. Schellin

[57] ABSTRACT

The invention relates to an electronic balance for use in an explosive environment. The invention calls for an intrinsically safe cable (1) which contains data lines in addition to the voltage supply lines. The data is serially transferred on the data lines. A first conversion unit is housed in the housing of a power pack which conversion unit receives the data arriving serially via the cable (1), converts it into parallel data and stores it so that it can be passed on in a parallel and asynchronous manner in the non-explosive area, that a second conversion unit is housed in the housing of the power pack which second conversion unit stores the data arriving in parallel manner from the non-explosive area, converts it into serial data and sends it serially via the cable (1) into the explosive area, and that the control unit (3) also contains at least a first conversion unit which receives the data arriving serially via the cable (1), converts it into parallel data, stores it and passes it on in parallel manner to the evaluation unit. The control unit contains at least one second conversion unit which stores the data arriving in parallel manner from the evaluation unit, converts it into serial data and sends it serially via the cable (1).

5 Claims, 4 Drawing Sheets

ELECTRONIC BALANCE WITH DATA OUTPUT FOR USE IN EXPLOSIVE AREAS

The invention relates to an electronic balance for use in explosive environments at hazardous locations consisting of a weighing system with intrinsically safe evaluation unit, an intrinsically safe digital display unit and a control unit and a power pack which is arranged in a separate housing outside of the explosive area. The system connected via a cable which is intrinsically safe as regards explosion technology and comprises at least one plug connection which is intrinsically safe as regards explosion technology to the weighing system, the evaluation unit and the display unit and control unit.

BACKGROUND OF THE INVENTION

Balances of this type are known e.g. from Swiss patent 668,125. The use of separate data lines and an interface transducer outside of the explosive area in order to transmit data to and from the balance is also known (see e.g. D. Klausgrete: Elektronische Wagetechnik in explosiongefährdeten Bereichen [German=Electronic Weighing Technology in Explosive Areas]. Company publication of Sartorius AG (1991), pp. 43–46). General reference is also made to such US technical concepts set forth in the US Standards of the NFPA, "Standards for Intrinsically Safe Apparatus and Associated Apparatus for Use in Class I, II, and III, Division 1 Hazardous Locations." Copyright © 1979 NFPA (National Fire Protection Association, 1 Batterymarch Park, Quincy, Mass. 02269-9101; <webmaster@nfpa.org>).

These known solutions have the disadvantages that the installation cost is relatively high on account of the separate cables for the voltage supply and for the data transmission and that the plurality of the required data lines renders a correspondingly thick and awkward cable with multipole plugs necessary. This high installation cost is especially disadvantageous for explosive areas with their special requirements.

SUMMARY OF THE INVENTION

The invention therefore has the problem of distinctly lowering the installation cost for an electronic balance of the initially cited type with a data output.

The invention achieves this in that the intrinsically safe cable also contains data lines in addition to the voltage supply lines, that the data is serially transmitted on the data lines, that at least a first conversion unit is housed in the housing of the power pack which conversion unit receives the data arriving serially via the cable, converts it into parallel data and stores it so that it can be passed on in a parallel and asynchronous manner in the non-explosive area, that at least a second conversion unit is housed in the housing of the power pack which second conversion unit stores the data arriving in parallel manner from the non-explosive area, converts it into serial data and sends it serially via the cable into the explosive area, and that the evaluation unit also contains at least a first conversion unit which receives the data arriving serially via the cable, converts it into parallel data, stores it and passes it on in parallel manner to the evaluation unit and contains at least one second conversion unit which stores the data arriving in parallel manner from the evaluation unit, converts it into serial data and sends it serially via the cable.

The serial data transmission from the explosive area into the non-explosive area and vice versa drastically reduces the number of required data lines so that the data lines can be integrated into the cable for the supplying of the supply voltage. Advantageous embodiments serving in particular for the immunity to interference in of the data lines in spite of the spatially closely adjacent lines for the supply voltage.

BRIEF DESCRIPTION OF THE DRAWINGS

The invention is described in the following with reference made to the schematic figures.

Figure 1:
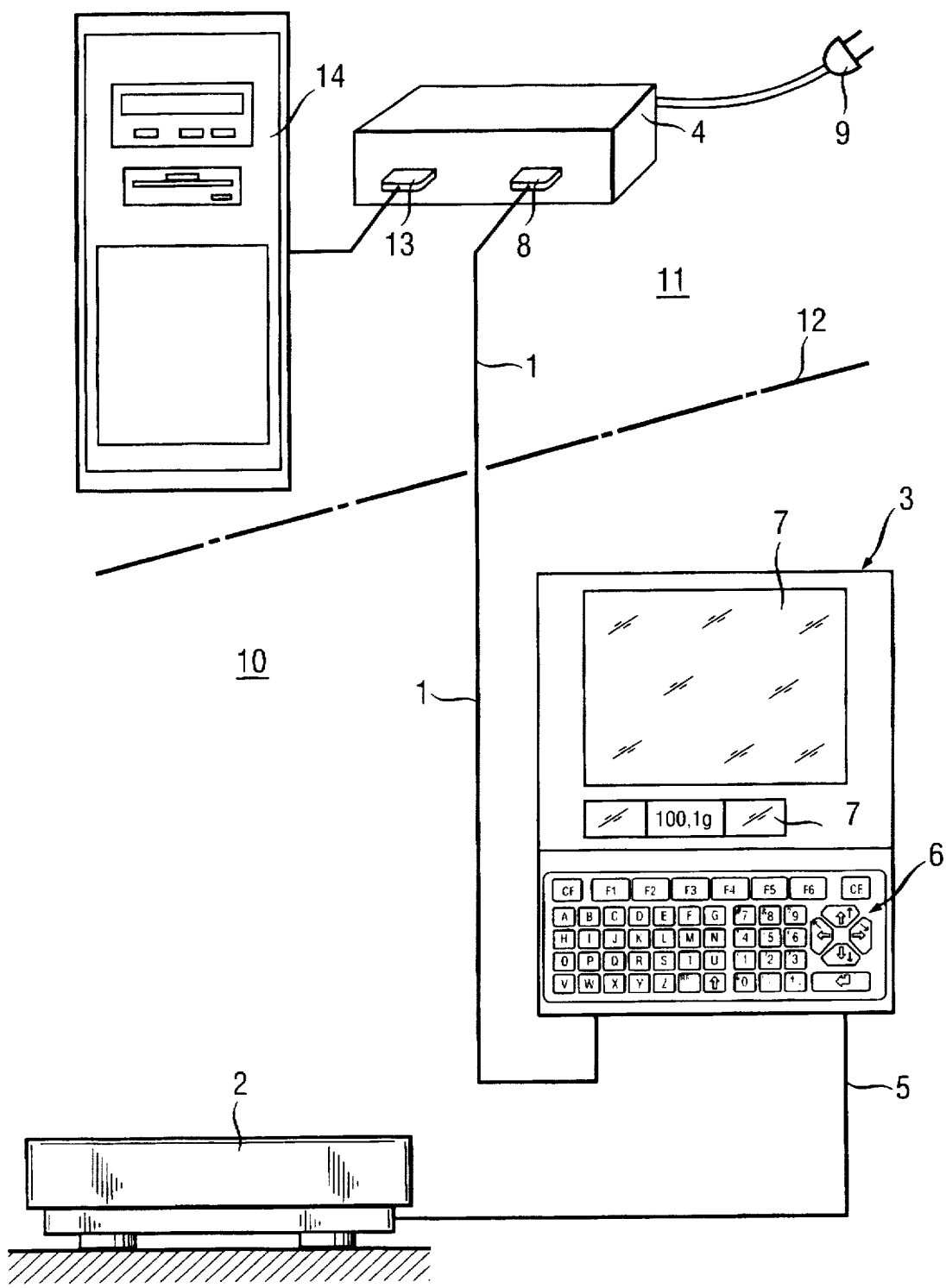
FIG. 1 shows the entire arrangement of the various parts of the balance in a first embodiment.

A load platform 2, display- and control unit 3 with control keys (keyboard) 6 and a display field (display) 7 as well as a power pack 4 can be seen in FIG. 1. These three parts of the electronic balance are connected to each other by cables 1 and 5. The evaluation electronics of the balance is housed either in the housing of load platform 2 or in the housing of display and control unit 3 and is built up in an intrinsically safe manner. Load platform 2 and display and control unit 3 are located in explosive area 10 and are connected to one another by intrinsically safe cable 5. Power pack 4 is located in area 11 which is outside of explosive area 10. Cable 1, which is also intrinsically safe, connects power pack 4 to display- and control unit 3 and transcends boundary 12 between explosive area 10 and non-explosive area 11. Cable 1 is connected by intrinsically safe plug connection 8 to power pack 4. Power pack 4 comprises a connection cable with a conventional (non-explosive) main plug 9 for connection to the conventional (non-explosive) supply voltage.

The construction of the individual components and their connection to each other is generally known, so that they do not have to be explained in detail and the observance of the explosion protection regulations also does not have to be presented in detail.

In the embodiment in accordance with the invention even the data lines are integrated into cable 1, which is explained in detail below. A serial/parallel conversion of the data transmitted serially via the cable takes place in the housing of power pack 4 and the data can be passed on in a parallel manner via multipole plug connection 13 in non-explosive area 11. In a corresponding manner data arriving in a parallel manner via plug connection is converted in a parallel/serial manner in the housing of power pack 4 and serially transmitted via cable 1 to display- and control unit 3 and converted there into parallel data again and made available to the display- and control unit and the evaluation unit of load platform 2 for further processing.

Figure 3:
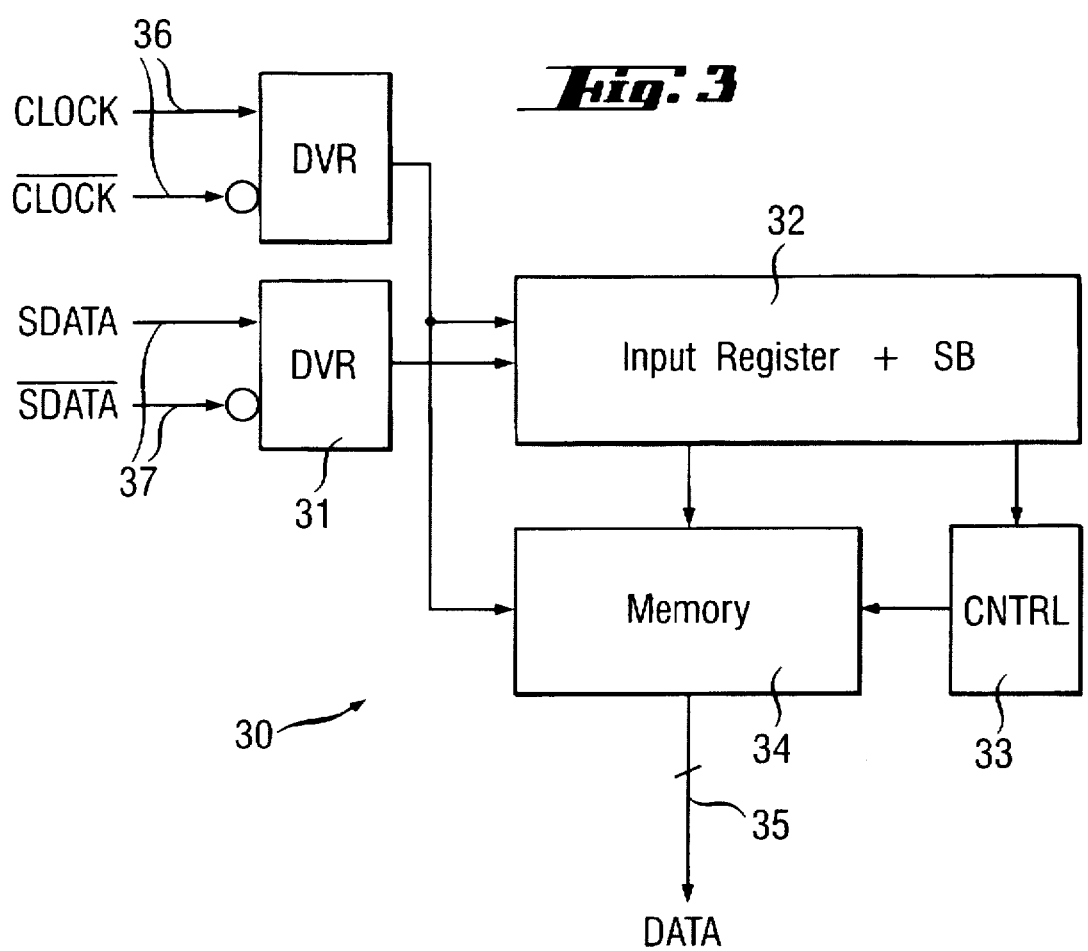
FIG. 3 shows a block circuit diagram of the first conversion unit for serial/parallel conversion.
Figure 4:
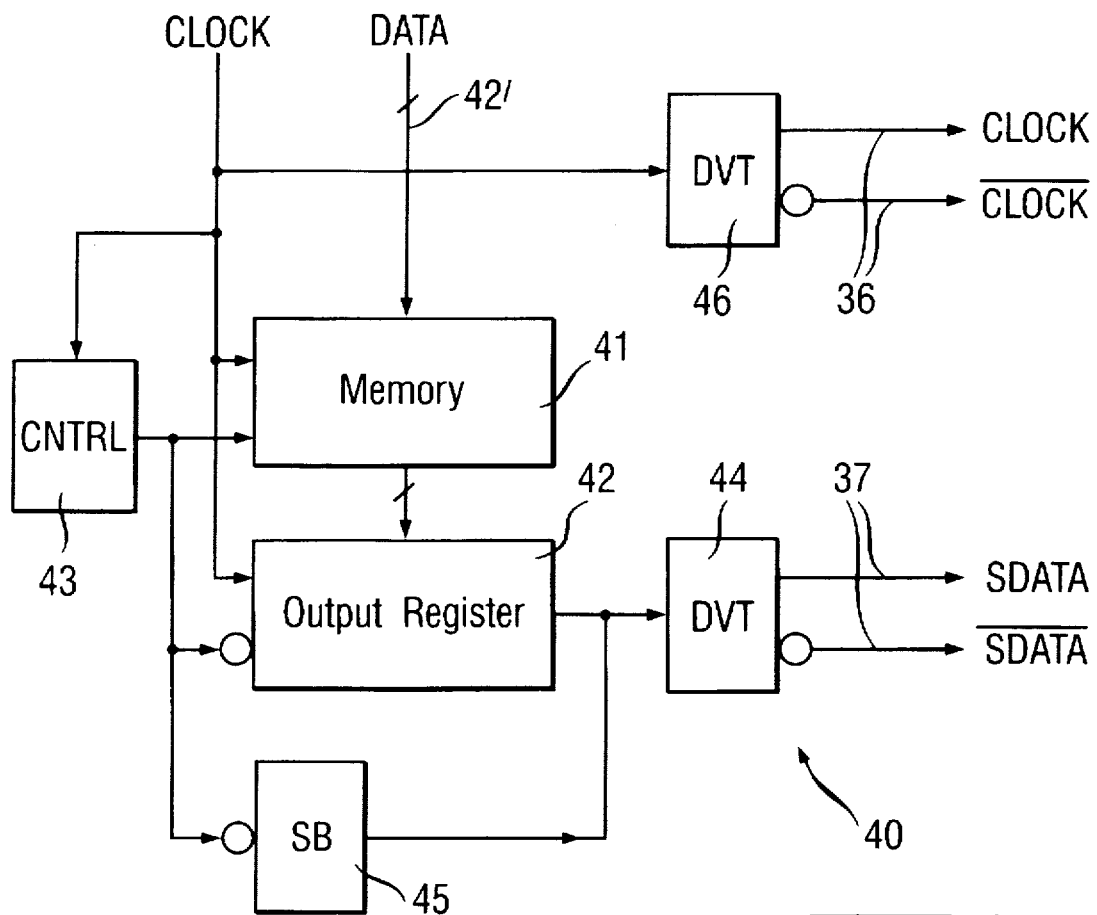
FIG. 4 shows a block circuit diagram of the second conversion unit for parallel/serial conversion.
Figure 5:
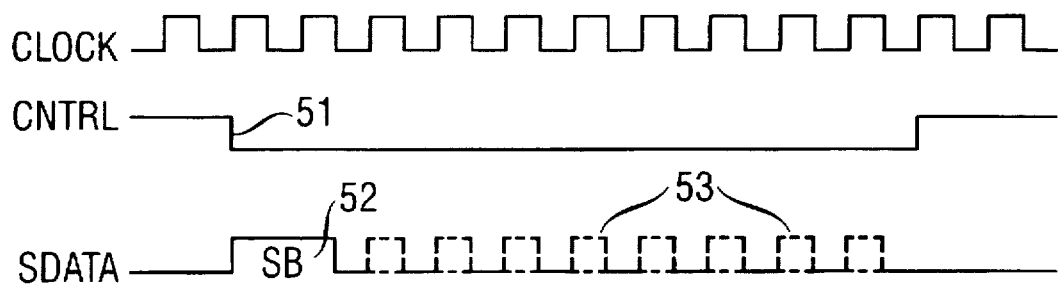
FIG. 5 shows a pulse diagram of the serial data transmission.

The serial/parallel conversion, the parallel/serial conversion and the serial data transmission via cable 1 are shown in FIGS. 3 to 5. FIG. 3 shows a block circuit diagram of the conversion unit for serial/parallel conversion (first conversion unit), FIG. 4 shows a block circuit diagram of the conversion unit for parallel/serial conversion (second conversion unit) and FIG. 5 shows the pulse diagram of the serial data transmission on cable 1.

The first conversion unit (receiver unit) 30 consists of input stage 31 (differential voltage receiver) which receives the differential signals from the data lines (double line) 37 in cable 1; input stage 31 is followed by input register 32 which stores the incoming signals e.g. in the form of a shift register. A switching part ("SB") is integrated into this input register which part recognizes the start- and stop bit and selects therewith the individual blocks of the data transmission in a known manner. Control unit 33 ("CNTRL") is controlled by this switching part, which control unit controls the positionally correct assumption of the data from input register 32 into memory 34 after the end of the transmission of a data block. The data is then available in memory 34 in a parallel manner on multipole data output line 35 for being passed on in a parallel manner. In addition to double line 37 for the data the CLOCK signals are also transmitted in cable 1 via double line 36, which signals synchronize the serial inputting in of the individual data into input register 32 with the appropriate transmitter bit timing.

The second conversion unit (send unit) 40, shown in FIG. 4, consists of incoming storage 41 into which the data to be transmitted can be inputted in a parallel manner via line 42'. The data passes, also in a parallel manner, from incoming memory 41 to output register 42. The data is then read out serially from output register 42 and passed on to send unit 44 (differential voltage transmitter). A start-stop bit is added thereby by unit 45 (SB). The serial reading out and the generation of the start-stop bit is controlled by control unit 43 (CNTRL). Send unit 44 generates an opposite signal pulse, opposite clock pulse for a push-pull signal on the output thereby which signal is put on data lines 37 in cable 1. The CLOCK signal is likewise put via a send unit 46 with push-pull output on double line 36 in cable 1.

The transmission protocol of the serial data transmission is shown in FIG. 5. The CLOCK pulses are sketched in the uppermost line, the signal of control unit 43 in the second line and in the third line the signals put from send unit 44 onto data lines 37. Triggered by the negative leg 51 of the control unit, start-stop bit 52 is generated at first by unit 45 and then the individual data stored in output register 42 is serially transmitted. In the example shown 8 data arriving in parallel via line 42' are transmitted further serially and the data block therefore has the length of 8 CLOCK pulses. A pulse or no pulse appears on the appropriate position depending on whether a 0 or a 1 is transmitted—which is indicated in FIG. 5 by showing pulses 53 in dotted lines. After the end of the serial transmission of all 8 data the control signal goes back to HIGH again and after a pause the next data transmission occurs. The assumption of the new data from incoming storage 41 into output register 42 takes place in this pause. The data serially transmitted via data lines 37 in cable 1 is converted back into parallel data at the other end of cable 1 in the manner already described for FIG. 3.

A send unit 40 is housed in the housing of the power pack which send unit sends the data to a receiver unit 30 in display- and control unit 3 in the explosive area. A send unit 40 is also housed in display- and control unit 3 which send unit transmits the data to a receiver unit 30 in power pack 4. This double design makes a data transmission in both directions possible. Of course, the transmission of the CLOCK pulses takes place only once.

On the whole, a considerable number of lines is saved by the serial data transmission. In the case of data lines arriving in parallel, 16 double lines are needed for bidirectional transmission. In the case of serial transmission the number of double lines required is reduced to 3 (one for each direction and a CLOCK line). In the case of 16 arriving data lines the reduction of the number of data lines is even greater.

Since in cable 1 both lines for the voltage supply as well as the data lines are conducted directly adjacent to each other, special attention should be paid to the noise immunity of the data transmission. It has therefore already been provided in the above that the data lines are designed as double lines on which the data is transmitted as differential signals. The noise immunity is additionally increased if the double lines are twisted. Another possibility is the use of coaxial cables, which also assure good noise immunity due to their symmetrical design. The final transmission stage of second conversion unit 40 is designed in such a manner in this instance that it supplies an asymmetric output signal grounded on one side. A third advantageous possibility is the use of optical waveguides and of opto-couplers at the ends, which entirely excludes a disturbance by electromagnetic fields and also assures the separation of potential between the circuits in the explosive area and the circuits outside of the explosive area. Of course, the requirements of explosion technology regarding maximum power, etc. must be observed by the opto-couplers. A fourth method of increasing the noise immunity which could also possibly be additionally employed are software methods such as e.g. the transmission of additional redundant data such as e.g. parity bits or double transmissions with comparison, etc.

The measures and circuits in accordance with the invention make possible a simple possibility of transmitting data and commands from the balance and to the balance. This makes it possible to control the balance by a PC 14 (in FIG. 1) located outside of the explosive area and to allow the weighed data to be processed by this PC. The PC can store e.g. formulary, prescriptions and theoretical weights. It can also drive e.g. display 7 of the balance. This applies both to the display of the pure weighing results as well as to the display of additional information such as e.g. component names, adjustment instructions, etc. Likewise, PC 14 can be operated via keyboard 6. This distinctly reduced the scope of the necessary electronics in the explosive area; nevertheless, PC 14 can be operated in such a manner via display 7 and keyboard 6 as if it were located in the explosive area 10.

Figure 2:
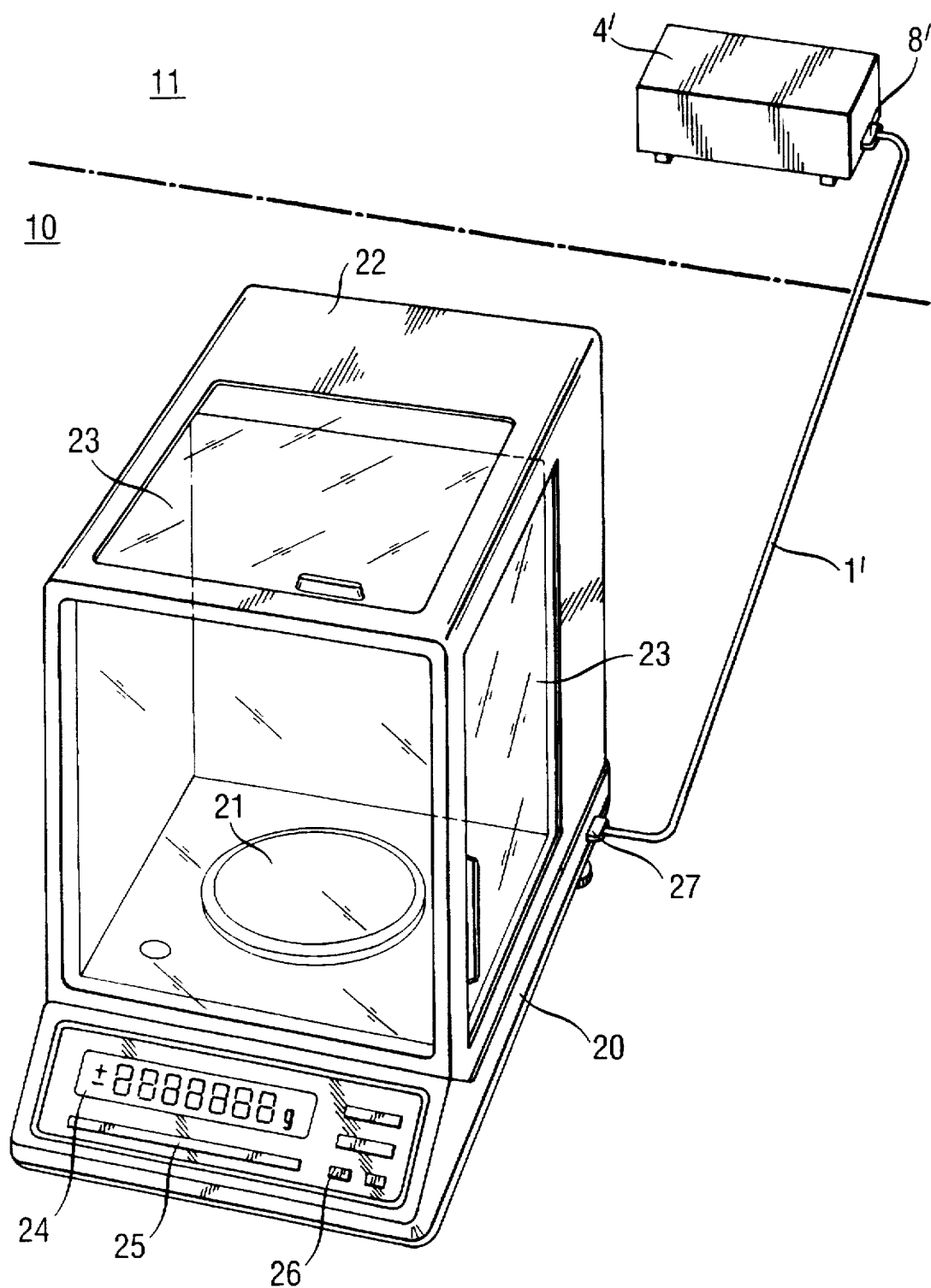
FIG. 2 shows the entire arrangement of the various parts of the balance in a second embodiment.

FIG. 2 shows a second variant of the entire arrangement of the electronic balance again. In this variant the load platform and the display- and control unit are combined in a single housing 20. It is a laboratory balance. Balance scale 21, windshield 22, whose doors 23 can be opened for loading, display 24 and control keys 25, 26 can be recognized. Intrinsically safe cable 1' for transmitting the supply voltage and the data is fastened to housing 20 of the balance by plug 27 and to power pack 4' by plug 8'. Otherwise, this embodiment corresponds to that of FIG. 1.

We claim:

1. An electronic balance for use in explosive areas consisting of a weighing system with intrinsically safe evaluation unit (2, 3, 20), an intrinsically safe digital display- and control unit (3, 24 . . . 26) and a power pack (4, 4') which is arranged in a separate housing outside of the explosive area, is connected via a cable (1, 1') which is intrinsically safe as regards explosion technology and comprises at least one plug connection (8, 8', 27) which is intrinsically safe as regards explosion technology to the weighing system, the evaluation unit and the display- and control unit, characterized in That the intrinsically safe cable (1) also contains data lines (37) in addition to the voltage supply lines, That the data is serially transferred on the data lines (37), That at least a first conversion unit (30) is housed in the housing of the power pack (4, 4') which conversion unit receives the data arriving serially via the cable (1, 1'), converts it into parallel data and stores it so that it can be passed on in a parallel and asynchronous manner in the non-explosive area.

That at least a second conversion unit (40) is housed in the housing of the power pack (4, 4') which second conversion unit stores the data arriving in parallel manner from the non-explosive area, converts it into serial data and sends it serially via the cable (1, 1') into the explosive area.

And that the evaluation unit (2/3, 20) also contains at least a first conversion unit (30) which receives the data arriving serially via the cable (1, 1'), converts it into parallel data, stores it and passes it on in parallel manner to the evaluation unit and contains at least one second conversion unit (40) which stores the data arriving in parallel manner from the evaluation unit, converts it into serial data and sends it serially via the cable (1,1').

2. The electric balance according to claim 1, characterized in that the data lines (37) are designed as double lines on which the data is transmitted as differential signals.

3. The electric balance according to claim 2, characterized in that the data lines (37) are designed as twisted double lines.

4. The electric balance according to claim 1, characterized in that coaxial cables are used as data lines.

5. The electric balance according to claim 1, characterized in that optical waveguides are used as data lines.

* * * * *